| (12) | United States Patent | (10) Patent No.: | US 10,106,337 B2 |
|---|---|---|---|
| | Robbin | (45) Date of Patent: | Oct. 23, 2018 |

(54) OVERHEAD CONVEYOR SYSTEM AND DIP COATING LINE COMPRISING SAID SYSTEM

(75) Inventor: Joerg Robbin, Pfaeffingen (DE)

(73) Assignee: EISENMANN SE, Boeblingen (DE)

( * ) Notice: Subject to any disclaimer, the term of this patent is extended or adjusted under 35 U.S.C. 154(b) by 573 days.

(21) Appl. No.: 12/918,111

(22) PCT Filed: Jan. 27, 2009

(86) PCT No.: PCT/EP2009/000496
§ 371 (c)(1),
(2), (4) Date: Aug. 18, 2010

(87) PCT Pub. No.: WO2009/103400
PCT Pub. Date: Aug. 27, 2009

(65) Prior Publication Data
US 2011/0017132 A1 Jan. 27, 2011

(30) Foreign Application Priority Data
Feb. 21, 2008 (DE) ........................ 10 2008 010 401

(51) Int. Cl.
*B65G 49/04* (2006.01)
(52) U.S. Cl.
CPC ..... *B65G 49/0459* (2013.01); *B65G 49/0463* (2013.01)
(58) Field of Classification Search
CPC .......................... B65G 49/0459; B65G 49/0463
USPC ......................................................... 118/423
See application file for complete search history.

(56) References Cited

U.S. PATENT DOCUMENTS

| 4,772,374 | A | 9/1988 | Urquhart et al. |
| 5,058,508 | A | 10/1991 | Kavieff et al. |
| 5,531,830 | A | 7/1996 | Ichinose et al. |
| 6,419,983 | B1 | 7/2002 | Kreuzer |
| 6,571,970 | B1 * | 6/2003 | Spoeler .................. B62D 65/00 |
| | | | 187/254 |

(Continued)

FOREIGN PATENT DOCUMENTS

| DE | 94 08 846 U1 | 9/1994 |
| DE | 94 08 874 U1 | 9/1994 |

(Continued)

*Primary Examiner* — Dah-Wei D. Yuan
*Assistant Examiner* — Stephen A Kitt
(74) *Attorney, Agent, or Firm* — Schroeder Intellectual Property Law Group, LLC

(57) ABSTRACT

An overhead conveyor system for transporting articles, especially for transporting vehicle bodies, in a treatment line comprises at least one transport carriage which has a fastening device to which at least one article can be fastened. The transport carriage can be displaced along the track by at least one drive means. The transport carriage is designed in such a manner that the fastening device can be transported at least along one section of the track, in a laterally offset manner with respect to the track. The invention further relates to a dip coating line comprising at least one dip-coating tank which can be filled with a treatment liquid, into which tank articles to be treated, especially vehicle bodies, are dipped. A conveying system can displace the articles to be treated towards the dip-coating tank, into the inner edge of the dip-coating tank, out of the dip-coating tank and away therefrom.

16 Claims, 18 Drawing Sheets

(56) References Cited

U.S. PATENT DOCUMENTS

| | | | |
|---|---|---|---|
| 6,991,087 | B2 | 1/2006 | Krannich et al. |
| 7,270,134 | B2 | 9/2007 | Mueller et al. |
| 8,561,780 | B2 | 10/2013 | Albeck et al. |
| 9,228,272 | B2 | 1/2016 | Robbin |
| 2003/0056723 | A1 | 3/2003 | Ehrenleitner |
| 2005/0061239 | A1* | 3/2005 | Kyotani ............ 118/423 |
| 2005/0139158 | A1 | 6/2005 | Matsubara et al. |
| 2006/0037535 | A1* | 2/2006 | Weinand ............ 118/423 |
| 2006/0249351 | A1 | 11/2006 | Matsubara et al. |
| 2007/0062060 | A1 | 3/2007 | Swoboda |
| 2007/0212941 | A1* | 9/2007 | Hisashi et al. .......... 439/607 |
| 2015/0013598 | A1 | 1/2015 | Robbin |

FOREIGN PATENT DOCUMENTS

| | | |
|---|---|---|
| DE | 43 26 563 A1 | 2/1995 |
| DE | 100 57 150 A1 | 5/2002 |
| DE | 101 03 837 B4 | 9/2002 |
| DE | 10306826 A1 * | 4/2004 |
| DE | 102 61 337 A1 | 7/2004 |
| EP | 1 547 947 A1 | 6/2005 |
| EP | 1 741 646 A1 | 1/2007 |
| GB | 2 217 348 A1 | 10/1989 |
| GB | 2 224 252 A1 | 5/1990 |
| GB | 2 233 622 A1 | 1/1991 |
| JP | 59-137220 U | 9/1984 |
| JP | 1-139410 A | 5/1989 |
| JP | 1-129270 U | 9/1989 |
| JP | 2-274486 A | 11/1990 |
| JP | 3-3811 A | 1/1991 |
| JP | 3-69567 U | 7/1991 |
| JP | 6-135508 A | 5/1994 |
| JP | 7-97009 A | 4/1995 |
| JP | 2000-43712 A | 2/2000 |
| JP | 2003-237563 A | 8/2003 |
| JP | 2004-315837 A | 11/2004 |
| JP | 2005-289102 A | 10/2005 |

* cited by examiner

OVERHEAD CONVEYOR SYSTEM AND DIP COATING LINE COMPRISING SAID SYSTEM

RELATED APPLICATIONS

This application claims the filing benefit of International Patent Application No. PCT/EP2009/000496, filed Jan. 27, 2009, which claims the filing benefit of German Patent Application No. 10 2008 010 401.9 filed Feb. 21, 2008, the contents of which are incorporated herein by reference.

TECHNICAL FIELD

The invention relates to an overhead conveyor system for transporting objects, in particular for transporting vehicle bodies in a treatment plant, having:
 a) at least one transport carriage which includes a securing device to which at least one object may be secured;
 b) at least one rail carrying the transport carriage;
 c) at least one drive means for moving the transport carriage along the rail;
 in which
 d) the securing device is always arranged below the rail.
In addition, the invention relates to a dip treatment plant, having:
 a) at least one dip bath which can be filled with a treatment liquid and into which objects to be treated, in particular vehicle bodies, can be dipped;
 b) a conveying plant which can bring the objects to be treated to the dip bath, put them into the interior of the dip bath, take them out of the dip bath and move them away therefrom.

BACKGROUND OF THE INVENTION

In the text that follows, the term "below" is used when a component is arranged lower down than a further component. This does not mean that the component arranged lower down has to overlap with the component arranged higher up, as seen in the vertical direction. The latter condition is expressed in the text that follows by the term "under". The terms "above" and "over" are correspondingly used of a component which is arranged higher up than a further component.

In an overhead conveyor system that is described in U.S. Pat. No. 6,571,970 B1 and in other commercially known overhead conveyor systems as are used in dip treatment plant, in particular in dip coating plant for vehicle bodies, the securing device is arranged under the rail on which the transport carriage runs, and in the case of U.S. Pat. No. 6,571,970 B1 the securing device may be moved in the vertical direction by means of a telescopic device.

The drive means, which for example include a drive carriage and where appropriate further components which are required to convey the transport carriage along the rail, are usually located in close proximity to the rail. When a vehicle body is secured to the securing device, the vehicle body is also located under the rail, the drive carriage and any further conveying components present.

Before a vehicle body is fed to a dip bath filled with liquid paint, a relatively complicated cleaning procedure is performed in which the vehicle body is cleaned, degreased and so on. It may happen that particles of dirt, oil or other means of soiling fall(s) off the conveying components concerned, from above the objects to be treated. In this case, the means of soiling may land on the vehicle body, which impairs the outcome of the cleaning procedure and may result in lower-quality painting.

During the cleaning procedure itself, during which the vehicle body may also be conveyed by an overhead conveyor system, particles of dirt falling from parts located over the vehicle body are also undesirable.

A cover which protects the vehicle body or other objects to be treated and which is arranged along the path of conveying the vehicle body and over the latter is extremely complicated to construct and is moreover expensive.

The present invention is directed to resolving these and other matters.

SUMMARY OF THE INVENTION

It is therefore an object of the invention to provide an overhead conveyor system of the type mentioned at the outset, in which the risk of the objects transported thereby coming into contact with means of soiling that fall from components arranged above the objects to be transported is reduced and the complexity of the apparatus for this is kept as low as possible.

The stated object may be achieved in an overhead conveyor system of the type mentioned at the outset in that
 f) the transport carriage is set up such that the securing device may be conveyed laterally offset from the rail, at least along a section of the rail.

In this way, the space over the securing device and indeed the space over the object secured thereto may be kept free inasmuch as, in particular, no components that are required to convey the transport carriage are arranged there.

It is advantageous if the securing device includes a holding structure with securing means which is carried only by way of a side surface of a further component of the transport carriage. Unlike known overhead conveyor systems, in which the securing device is held by a bracket which extends over and above the securing device, the securing device is secured to the holding structure by only one side. Thus, and once again, no components of the transport carriage that hold the securing device are arranged over the securing device.

It is advantageous if the holding structure is mounted on the further component of the transport carriage such that it is rotatable about a horizontal axis of rotation. In this way, it is possible for the object to achieve a movement sequence which is a superposition of a horizontal linear movement and a rotary movement about the horizontal axis of rotation. This does not mean that the movement of the object is always predetermined by a superposition of this kind. A horizontal linear movement alone, or a rotation about the horizontal axis of rotation alone, are also possible. Moreover, in this way it is possible for the axis of rotation to be arranged very close to the centre of gravity of the object, which is advantageous from the point of view of the forces that act on the transport carriage when the object rotates.

To increase the number of degrees of freedom of movement of the object, it is advantageous if the further component of the transport carriage, which holds the holding structure, is a vertically movable slide. In this way, the object may also be moved in a vertical linear movement.

From a structural point of view, it is advantageous if the slide is vertically movable by means of a telescopic device which may be retracted or extended in the vertical direction. This telescopic device may hold the vertically movable slide, or the latter may itself be a movable part of the telescopic device. In this construction, the transport carriage may substantially take the form of an L-shaped bracket, with the securing device representing the short, horizontal bar and the telescopic device approximately representing the long, vertical bar of the L. If no vertical movement is desirable or necessary, then a rigid connection may also be provided instead of the telescopic device.

To further increase the degrees of freedom of movement of the object, it is advantageous if the securing device is mounted such that it is rotatable about a vertical axis of rotation.

The said degrees of freedom of movement are particularly advantageous if the object is to be guided through a dip bath in a dip treatment plant.

If the transport carriage includes as the drive means a drive carriage which may be moved by motor on the rail, known components of overhead conveyor systems may be used, the use whereof is already known and which have been tried and tested.

When the telescopic device is used, it is advantageous if the telescopic device is mounted on the drive carriage of the transport carriage such that it is rotatable about the vertical axis of rotation. In this way, the transport carriage as a whole may be kept relatively compact and yet provide the object with a large number of possible degrees of freedom of movement.

Because the object is guided by the transport carriage suspended from the rail laterally alongside the rail, there is a risk that the transport carriage will tip in a horizontal direction towards the rail, which is caused chiefly by a force in the horizontal direction applied by the object. For this reason, it is advantageous if corresponding securing means are provided which secure the transport carriage to prevent tipping about a tilt axis parallel to the rail.

For this, the securing means may include a support structure which is arranged parallel to and below the rail and which supports the holding carriage.

The securing means may advantageously be constructed such that they include a guide roller which is mounted on the transport carriage, is rotatable about a vertical axis of rotation and is guided in a guide rail that is complementary thereto, with the guide rail running below the drive rail and parallel thereto.

It is moreover an object of the invention to provide a dip treatment plant of the type mentioned at the outset which takes account of the concept mentioned in the preceding text in relation to the overhead conveyor system.

This object is achieved in the case of a dip treatment plant of the type mentioned at the outset in that c) the conveying plant is the overhead conveyor system according to one of claims 1 to 11.

The advantages achieved thereby correspond to the advantages mentioned in the preceding text for the overhead conveyor system.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

FIGS. 8A to 8E show different views of a first exemplary embodiment of the telescopic arm as used in the transport carriage of the cataphoretic dip coating plant from FIG. 1, and FIGS. 9A to 9E show different views of a second exemplary embodiment of the telescopic arm as used in the transport carriage of the cataphoretic dip coating plant from FIG. 1.

FIGS. 1 to 18 illustrate a cataphoretic dip coating plant 200. The latter includes a dip bath 202 filled with liquid paint. Particles of paint migrate within an electrical field located between vehicle bodies 204 and anodes which are arranged along the path of movement of the vehicle bodies 204 and are not illustrated for reasons of clarity, towards the vehicle bodies 204 and are deposited thereon.

DETAILED DESCRIPTION OF THE PRESENT INVENTION

Figure 1:
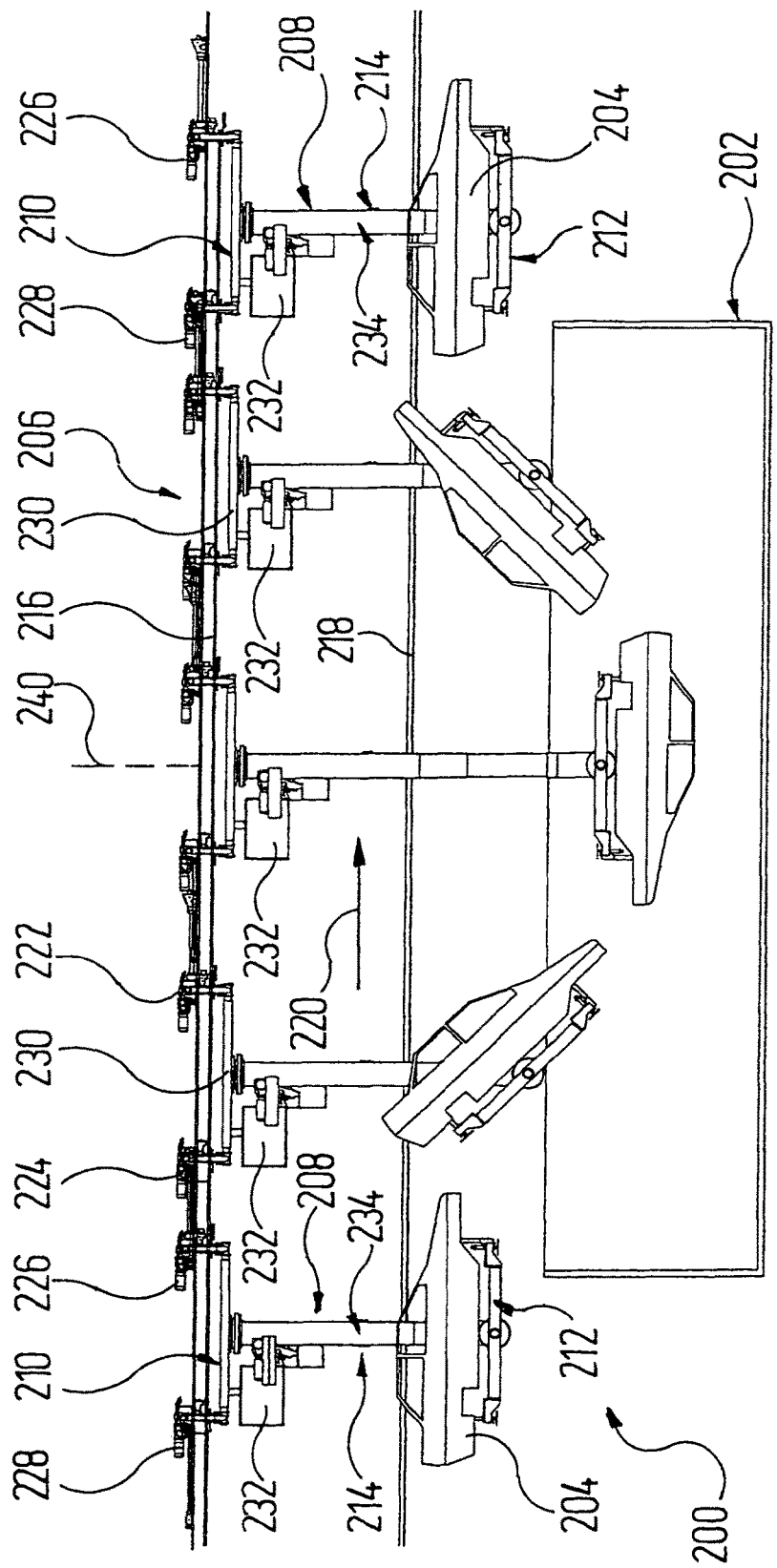
FIG. 1 shows in side view a cataphoretic dip coating plant for vehicle bodies.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

The vehicle bodies 204 are guided through the plant, and in particular through the dip bath 202 and the paint therein, with the aid of a conveyor system 206. The conveyor system 206 includes a plurality of transport carriages 208 which for their part have a drive carriage 210 and a holding carriage 212, which are coupled to one another by way of a telescopic device 214 which will be explained in detail below.

A drive rail 216 having an I-shaped profile, as used in conventional electric overhead conveyors, runs over the dip bath 202. Below the drive rail 216 and above the dip bath 202 there extends, parallel to the drive rail 216, a guide rail 218 having an upwardly open U-shaped profile.

The direction of movement in which the vehicle bodies 204 are conveyed by means of the conveyor system 206 is illustrated by an arrow 220 in FIG. 1. The drive rail 216 and the guide rail 218 are offset outwards, as seen in the direction perpendicular to the direction of movement 220, in relation to the centre of the dip bath 202, with the guide rail 218 extending further out than the drive rail 216.

The drive carriages 210 are basically of a construction that is known from conventional electric overhead conveyors. Each of these drive carriages 210 has a travelling gear 222 which leads in the direction of movement 220, called the "leader" in the language of the art, and a further travelling gear 224 which follows in the direction of movement 220 and is called the "trailer" in the language of the art. The leader 222 and trailer 224 are equipped in known manner with guide and support rollers, which are not designated by their own reference numeral here and which roll on different surfaces of the I-shaped profile of the drive rail 216. At least one of the rollers of the leader 222 or trailer 224 serves as a drive roller and for this purpose may be rotated by an electric motor 226 or 228. Where appropriate, it may be sufficient if only the leader 222 is driven. The transport carriage 208, which is driven by way of the drive carriage 210, may where appropriate also pass over inclines if the drive rail 216 has to extend at an angle in certain regions to adapt the path of conveying to local conditions.

Figure 2:
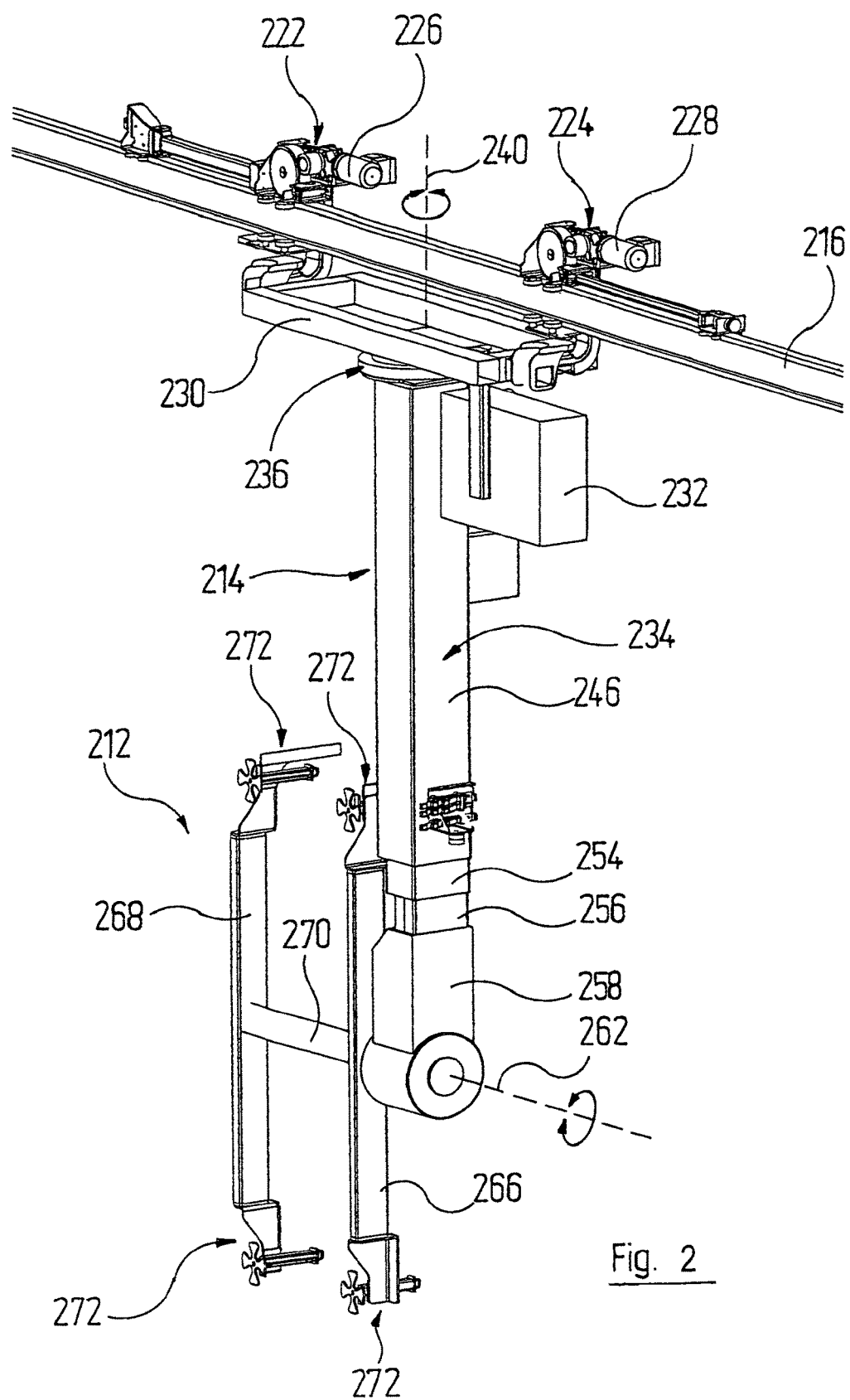
FIGS. 2 and 3 show, in perspective from different directions of view, a transport carriage having a telescopic arm as used to convey the vehicle bodies to be coated in the dip coating plant from FIG. 1, during the return procedure from the exit of the plant to its entry.
Figure 3:
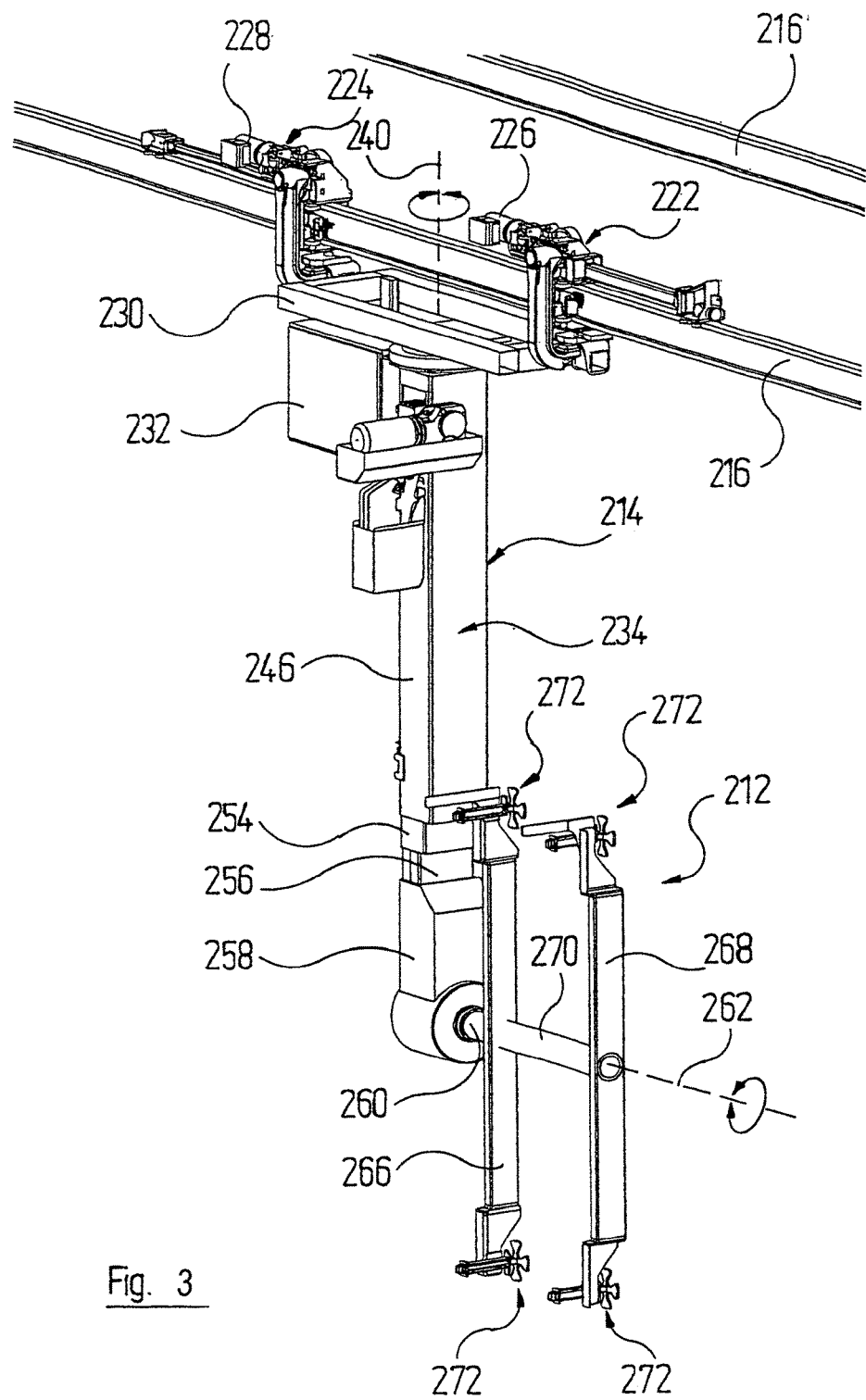
Figure 4:
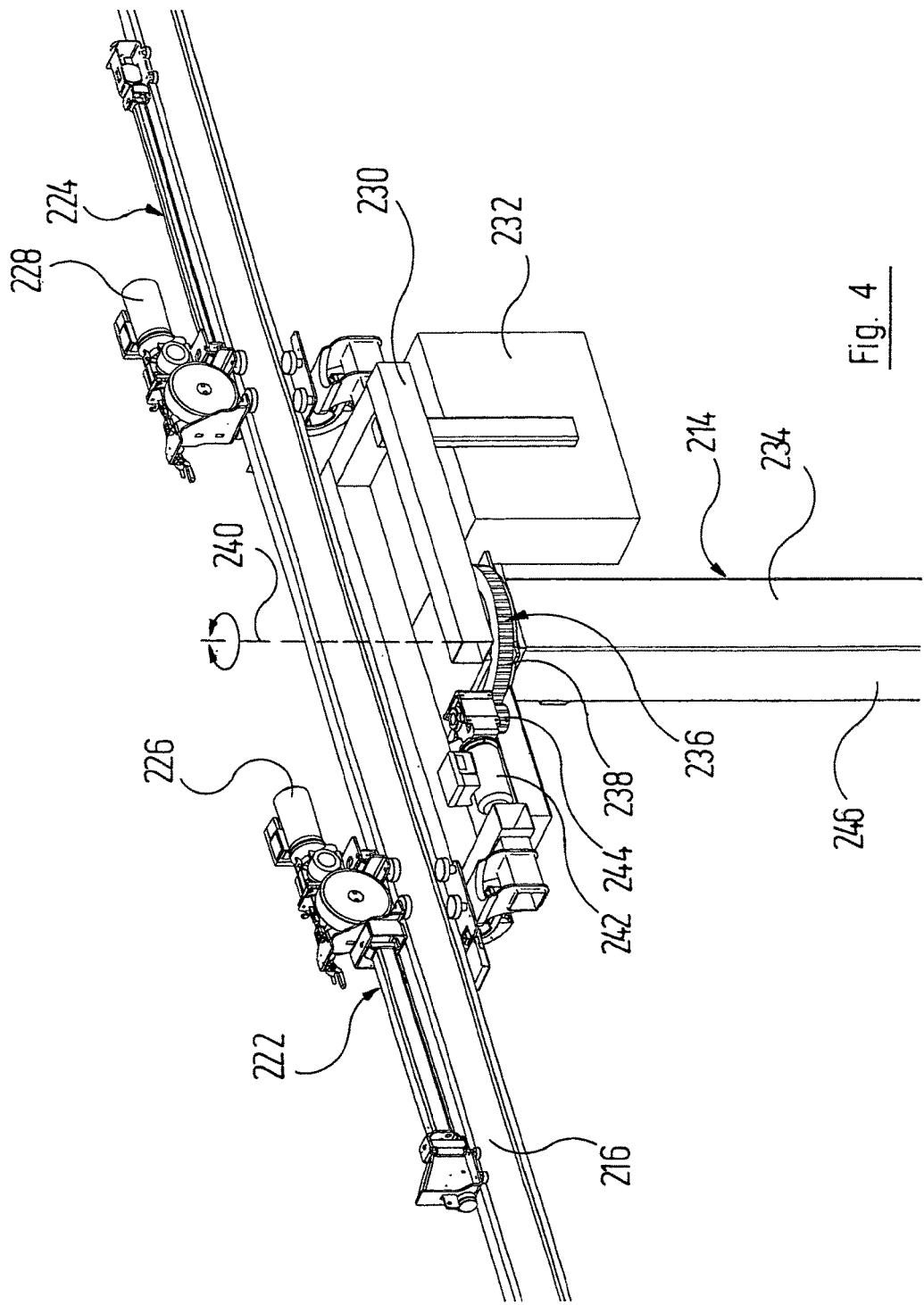
FIG. 4 shows, in perspective and on a larger scale, a detailed view of a drive carriage of the transport carriage as used in the cataphoretic dip coating plant from FIG. 1, in which a mechanism for rotating the telescopic arm is shown.

The leader 222 and trailer 224 of each drive carriage 210 are connected to one another by a connection frame 230 which is particularly readily visible in FIGS. 2 to 4.

The connection frame 230, for its part, in known manner carries a control device 232 which can communicate with the central control of the dip coating plant 200 and where appropriate with the control devices 232 of the other drive carriages 210 in the dip coating plant 200. In this way, it is possible to move the different transport carriages 208 largely independently.

The telescopic device 214 which couples the drive carriage 210 to the holding carriage 212 includes a three-part, vertically extending telescopic arm 234 which is variable in length. This is connected at its upper end to the end face of a toothed wheel 236 having an external toothing 238 in such a manner that it cannot rotate in relation thereto, such that the longitudinal axis of the telescopic arm 234 and the axis of rotation 240 of the toothed wheel 236 (cf. FIG. 4) coincide or at least lie closely next to one another. The toothed wheel 236 is for its part mounted rotatably on the connection frame 230, approximately centrally between the leader 222 and the trailer 224, such that the axis of rotation 240 extends vertically.

The toothed wheel 236 can be driven by means of a servo motor 242 which communicates with the control device 232 of the drive carriage 210 and which for this purpose drives a toothed wheel 244 engaging in the external toothing 238 of the toothed wheel 236. In this way, the telescopic arm 234 can be turned about the axis of rotation 240 in either the clockwise or the anticlockwise direction, depending on the direction of rotation of the pinion 244.

The servo motor 242 and the pinion 244 are shown only in FIG. 4, for the sake of clarity, and for this reason the connection frame 230 is partly cut away there.

Figure 5:
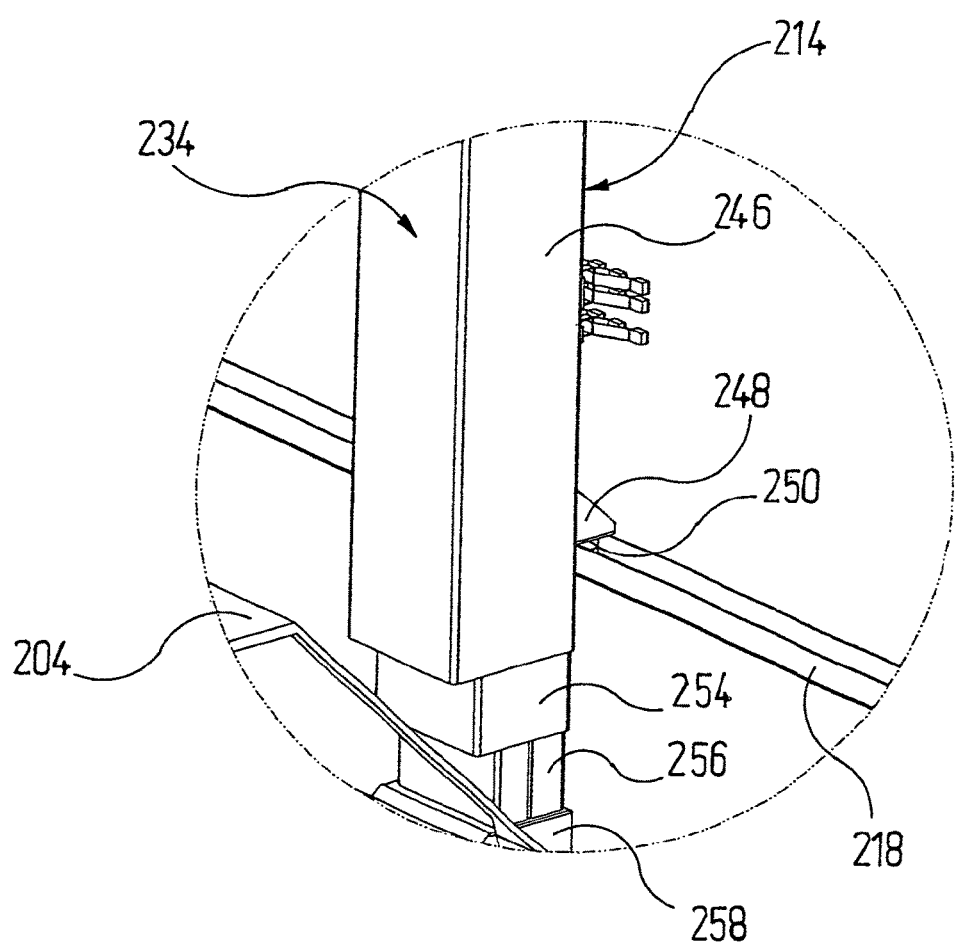
FIGS. 5 and 6 show, in perspective and on a larger scale, a detailed view from different directions of view of a side guide of the telescopic arm.
Figure 6:
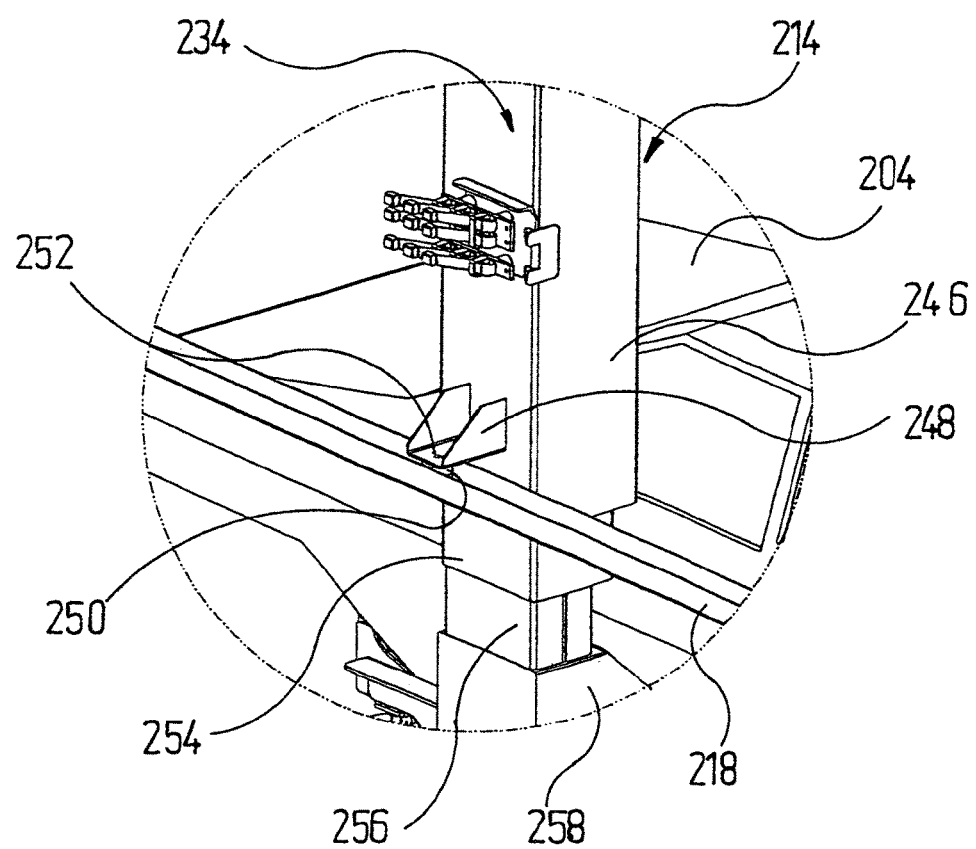

The telescopic arm 234 includes an upper telescopic part 246. This carries, at its end remote from the toothed wheel 236, and on a transverse crosspiece 248, a guide roller 250 which can turn freely about a vertical axis of rotation 252 and which runs in the U-shaped profile of the guide rail 218, as is in particular visible from FIGS. 5 and 6. In this way, the telescopic arm 234 is prevented from tilting out of the vertical in a plane which is perpendicular to the direction of movement 220.

Besides the upper telescopic part 246, the telescopic arm 234 includes a central telescopic part 254 and a lower telescopic part 256. The telescopic parts 246, 254 and 256 are displaceable in relation to one another, whereof more details will be given in the text that follows.

The lower telescopic part 256 serves as a slide 256 which is movable inside the central telescopic part 254, and will be designated as such in the text that follows. In the lower free end region 258 of the slide 256 there is mounted a rotary peg 260. The latter defines a horizontal axis of rotation 262 shown in FIGS. 2 and 3. The rotary peg 260 can be turned in both directions of rotation about the axis of rotation 262 by way of a geared motor 264 (cf. FIG. 7, where the cover is removed) which is entrained by the slide 256 in its lower end region 258 and communicates with the control device 232 of the transport carriage 208.

Figure 7:
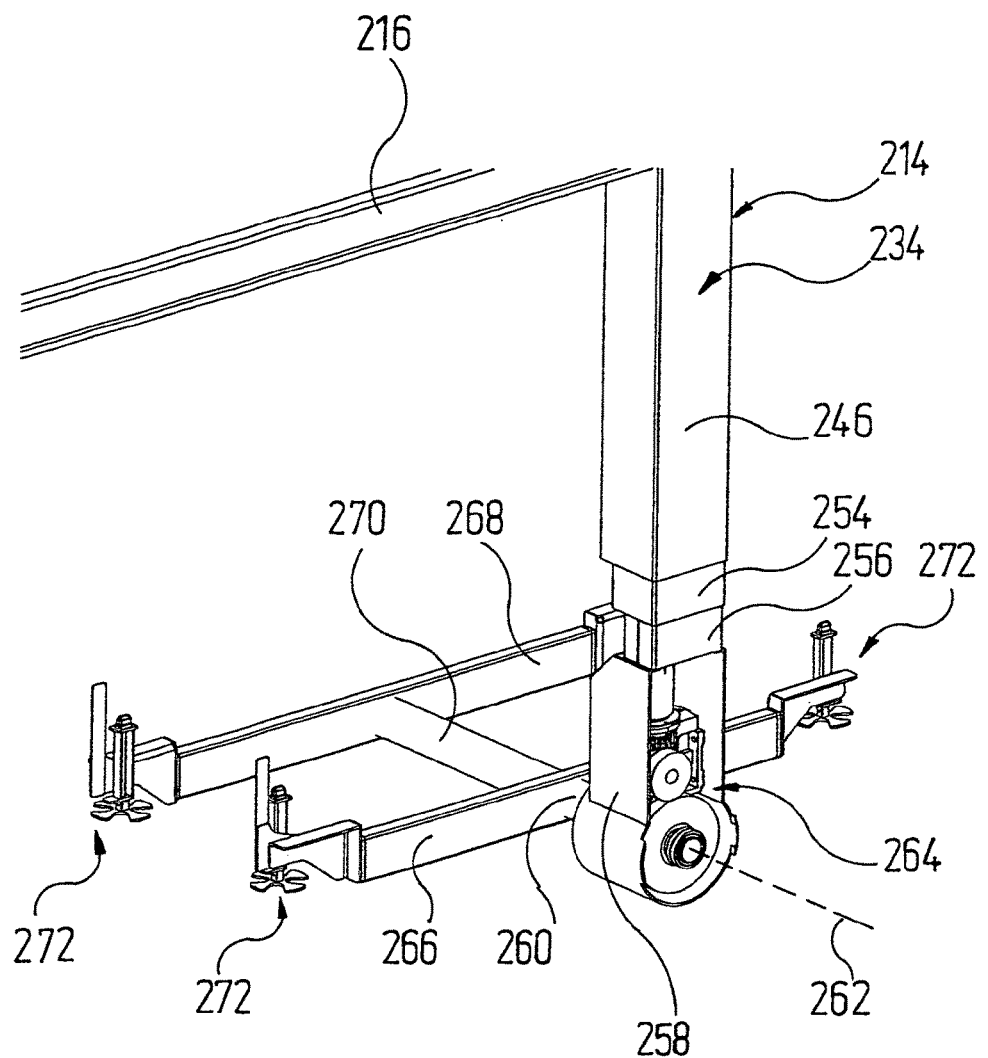
FIG. 7 shows, in perspective, a detailed view on a larger scale of a securing device of the transport carriage as used in the dip coating plant from FIG. 1.

As can in particular readily be seen from FIGS. 2, 3 and 7, the holding carriage 212 has two mutually parallel longitudinal bars 266 and 268 of rectangular cross-section, which are connected centrally by a transverse crosspiece 270 of circular cross-section, and which take the form of hollow profiles. The rotary peg 260 of the slide 256 is connected to the outer surface of the longitudinal bar 266 of the holding carriage 212 such that it cannot rotate in relation thereto, with the rotary peg 260 and the transverse bar 270 of the holding carriage 212 running coaxially with respect to one another. Securing means 272 are mounted on the end sides of the longitudinal bars 266 and 268 and can be used to detachably secure a vehicle body 204 to be coated to the holding carriage 212 in a manner known per se.

Thus, the slide 256 carries the holding carriage 212 by way of the rotary peg 260 only on one side, such that the transport carriage 208 as a whole takes the form of an L-shaped bracket. The transport carriage 208 may be aligned during its movement along the drive rail 216 such that the holding carriage 212, with the securing means 272, is arranged laterally offset from the drive rail 216. This makes it possible to ensure that none of the components of the conveyor system 206, for example the drive rail 216 or the drive carriage 210, among others, is arranged in the space vertically over the holding carriage 212 with the securing means 272. The risk of the vehicle body 204 becoming soiled by dirt such as dust, oil or similar falling off components of the conveyor system 206 is thus reduced.

As mentioned in the preceding text, the telescopic parts 246, 254 and 256 of the telescopic arm 234 may be moved relative to one another. For this purpose, the cross-sections of the individual telescopic parts 246, 254 and 256 are constructed to complement one another such that the central telescopic part 254 can be displaced in a manner guided inside the upper telescopic part 246 and the slide 256 can be displaced in a manner guided inside the central telescopic part 254.

Figure 8:
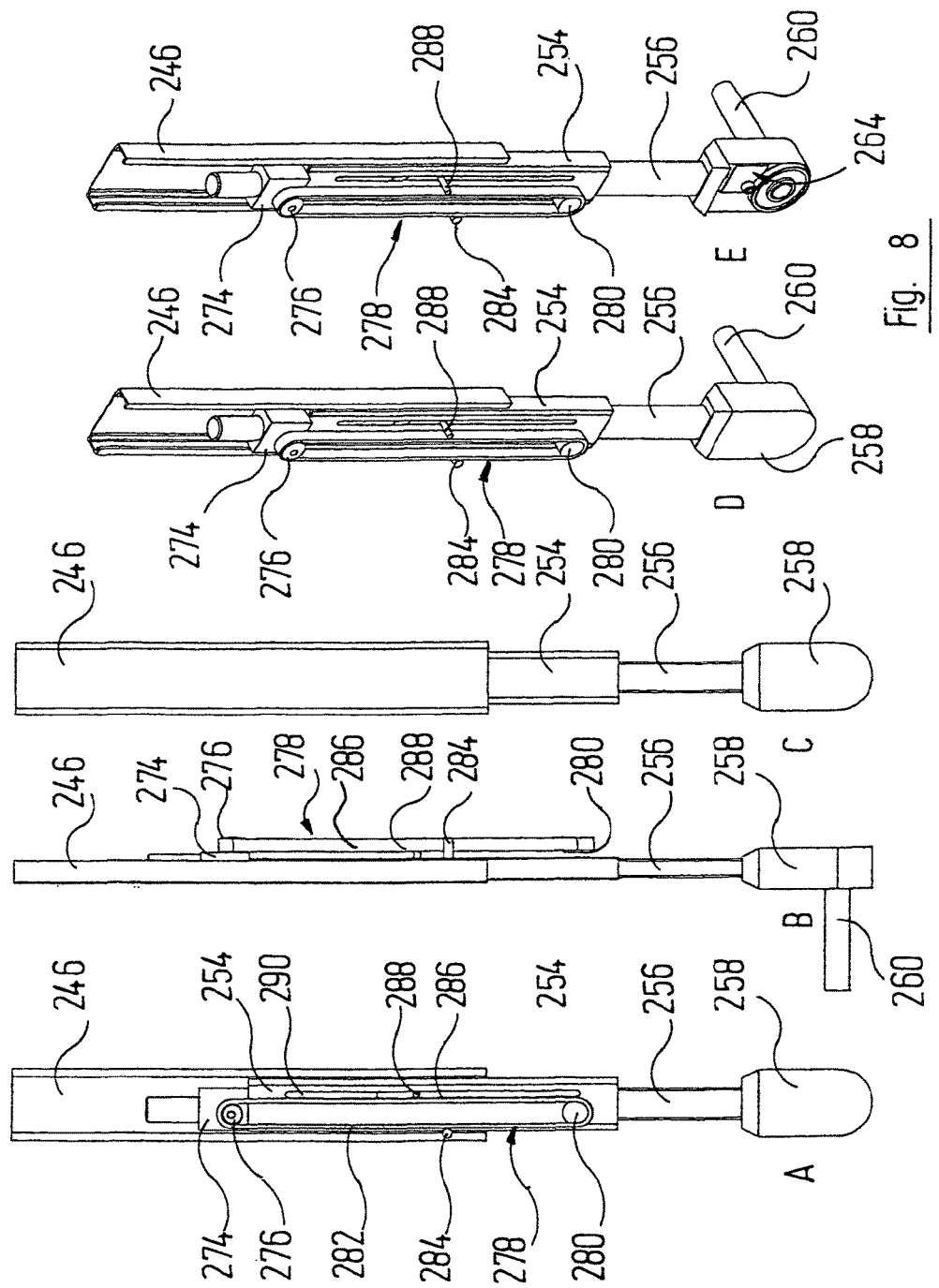

In a first exemplary embodiment of the telescopic arm 234, shown in FIG. 8 in partly cut-away views, the central telescopic part 254 carries at the end face of its upper end, which is always located inside the upper telescopic part 246, a servo motor 274 which communicates with the control device 232 of the transport carriage 208 and can drive a drive pinion 276 in two directions of rotation. A chain 278 runs both over the drive pinion 276 of the servo motor 274 and over a return pinion 280 which is mounted at the lower end of the central telescopic part 254, which projects downwards out of the upper telescopic part 246. The chain 278 is connected, at its side 282 on the left in FIG. 8A, to a connection pin 284 which for its part is attached non-movably to the upper telescopic part 246. The opposite, second side 286 of the chain 278 is coupled to a connection pin 288 which for its part is connected non-movably to the slide 256 of the telescopic arm 234. The connection pin 288 of the slide 256 runs in a slot 290 which is provided in a side wall of the central telescopic part 254, whereas the connection pin 278 of the upper telescopic part 246 is guided laterally past the central telescopic part 254.

When the servo motor 274 is controlled by the control device 232 of the transport carriage 208 such that the drive pinion 276 turns clockwise as seen in FIG. 8A, the connection pin 288 coupled to the slide 256 is entrained downwards by the chain 278 such that the slide 256 is pushed out of the central telescopic part 254. At the same time, the central telescopic part 254 is pushed out of the upper telescopic part 246 because of the non-movable connection pin 284 secured to the upper telescopic part 246. In this way, as a whole the telescopic arm 236 is extended. The telescopic arm 234 can be retracted again by the drive pinion 276 being turned by the servo motor 274 such that it moves anticlockwise as seen in FIG. 8A.

Figure 9:
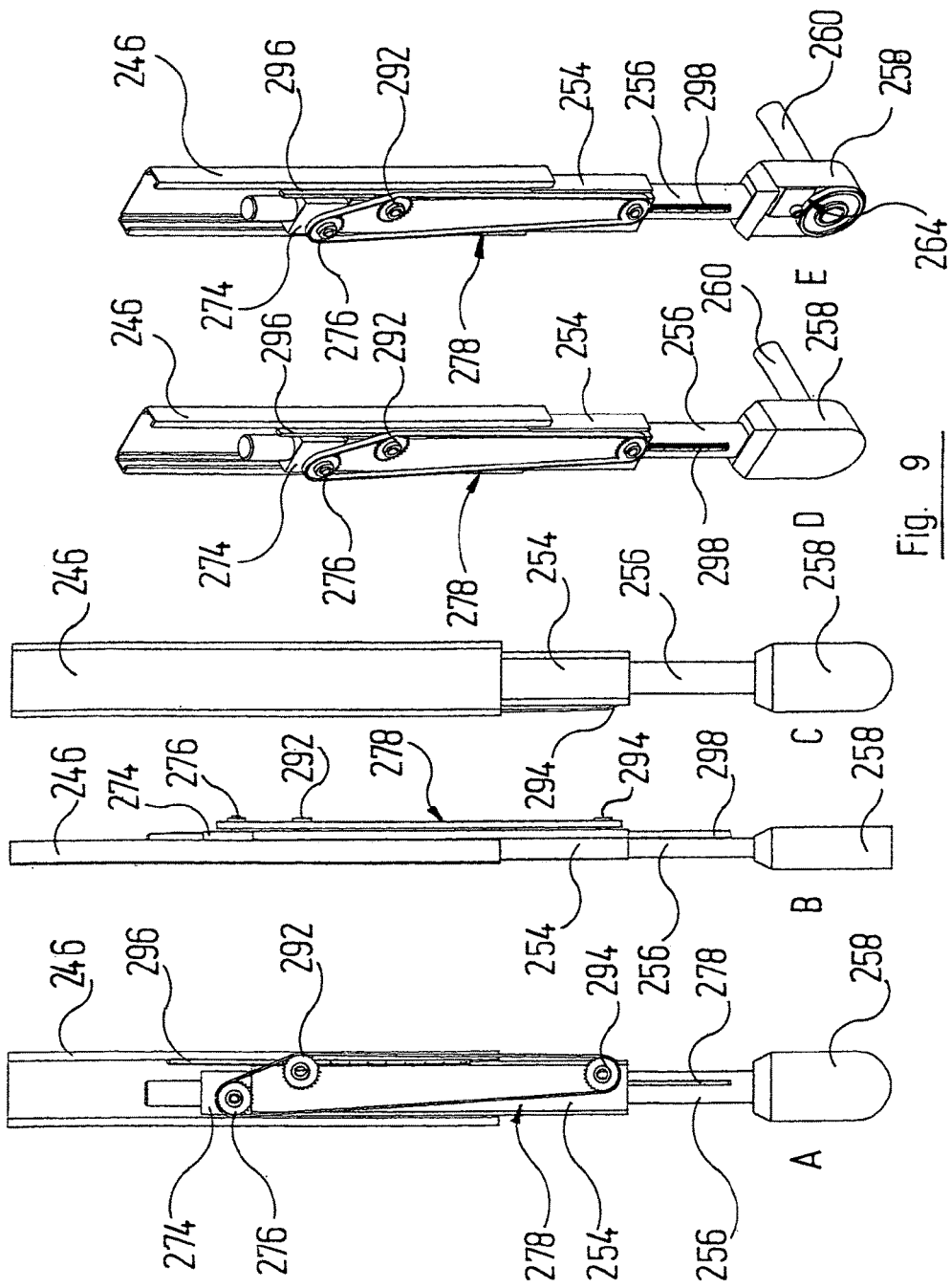

An alternative embodiment of the telescopic arm 234 is shown in FIG. 9 in partly cut-away views. There, the chain 278 runs over the drive pinion 276 of the servo motor 274 and over a first coupling pinion 292 and a second coupling pinion 294. The coupling pinions 292 and 294 each carry a spur wheel in coaxial manner; these are not visible in the views of FIG. 9. The external toothing of the spur wheel on the coupling pinion 292 engages in a toothed rack 296, the latter being non-movably connected to the upper telescopic part 246 of the telescopic arm 234, and is arranged in the upper region of the central telescopic part 254. The coupling pinion 294, on the other hand, is arranged in the lower region of the central telescopic part 254; the toothing of the spur wheel mounted thereon engages in a toothed rack 298 which is non-movably connected to the slide 256 of the telescopic arm 234. For this purpose, the spur wheel (not visible) on the coupling pinion 294 extends through a side wall of the central telescopic part 254.

When the servo motor 274 is controlled by the control device 232 of the transport carriage 208 such that the drive pinion 276 turns anticlockwise as seen in FIG. 9A, the coupling pinions 292 and 294 are also turned anticlockwise. As a result of the spur wheels secured thereto engaging in the toothed racks 296 and 298 respectively, the central telescopic part 254 of the telescopic arm 234 is pushed out of the upper telescopic part 246 and at the same time the slide 256 is pushed out of the central telescopic part 254.

If the chain pinion 276 is turned clockwise, the slide 256 is retracted into the central telescopic part 254 and at the same time the latter is retracted into the upper telescopic part 246.

In the case of modifications which are not shown here, the raising and lowering movement of the telescopic parts 246 and 254 and the slide 256 may also be brought about by a sliding chain or similar devices.

Operation of the cataphoretic dip coating plant 200 described in the preceding text is as follows:

The vehicle bodies 204 to be coated are fed in a substantially horizontal alignment in FIG. 1 (cf. arrow 220) from a pre-treatment station in which the vehicle bodies 204 are prepared for the coating operation in known manner by being cleaned, degreased, etc.

For this the slide 256 is moved to its topmost position, in which the telescopic parts 256, 254 and 256 of the telescopic arm 234 are retracted inside one another, such that the latter adopts its smallest possible length. The corresponding position can be seen in perspective in FIG. 10. The drive carriage 210 of the corresponding transport carriage 208 is fed, with the aid of the electric motors 226 and 228, along the drive rail 216 to the dip bath 202, the associated holding carriage 212 being entrained by way of the telescopic device 214. During this, the guide roller 250 on the upper telescopic part 246 of the telescopic arm 234 rolls in the U-shaped profile of the guide rail 218, although this does not serve to support the weight. The weight of the transport carriage 208 and the vehicle body 204 secured thereto is entirely carried by the drive rail 216 by way of the drive carriage 210.

Figure 11:
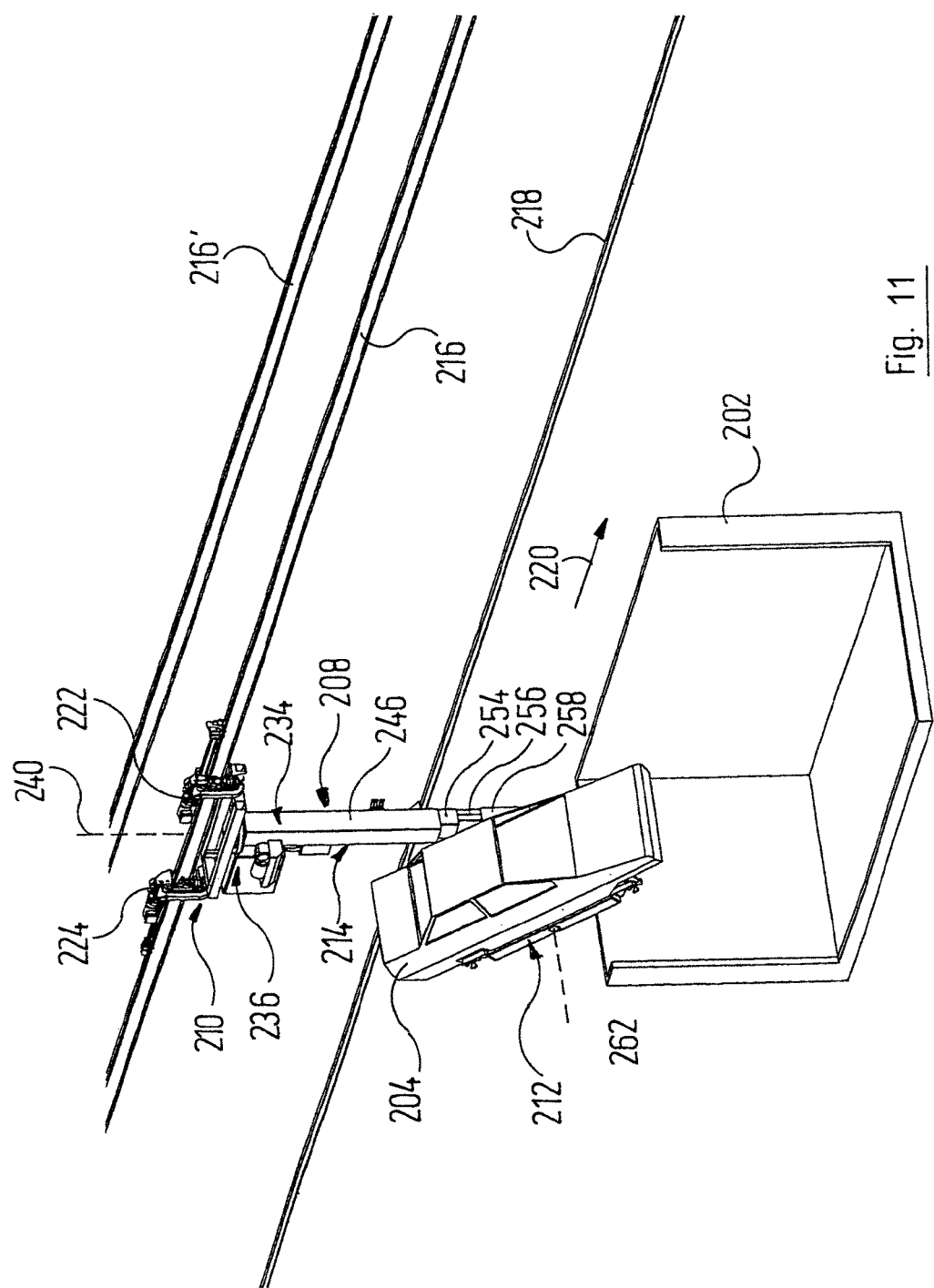

When the transport carriage 208 approaches the end wall of the dip bath 202 that is on the entry side, the slide 256 carrying the vehicle body 204 by way of the transport carriage 208 is progressively lowered, by the telescopic arm 234 being extended in the manner described in the preceding text, with the aid of the servo motor 274. As soon as the front end of the vehicle body 204 projects beyond the end wall of the dip bath 202 into the interior of the dip bath 202, the rotary peg 260 and hence the holding carriage 212 with the securing means 272 and the vehicle body 204 secured thereto are simultaneously turned with the aid of the geared motor 264 about the axis of rotation 262. Thus, in this region the overall movement of the vehicle body 204 can be regarded as the superposition of three movements, namely a horizontal linear movement (arrow 220) along the drive rail 216, a vertical linear movement along the axis of rotation 240 and hence also along the longitudinal axis of the telescopic arm 234, and a rotary movement, clockwise as seen in FIG. 1, about the axis of rotation 262 of the rotary peg 260. During this the vehicle body 204 is "wound" over the end wall of the dip bath 202 on the entry side. The corresponding position is illustrated in perspective in FIG. 11.

Figure 12:
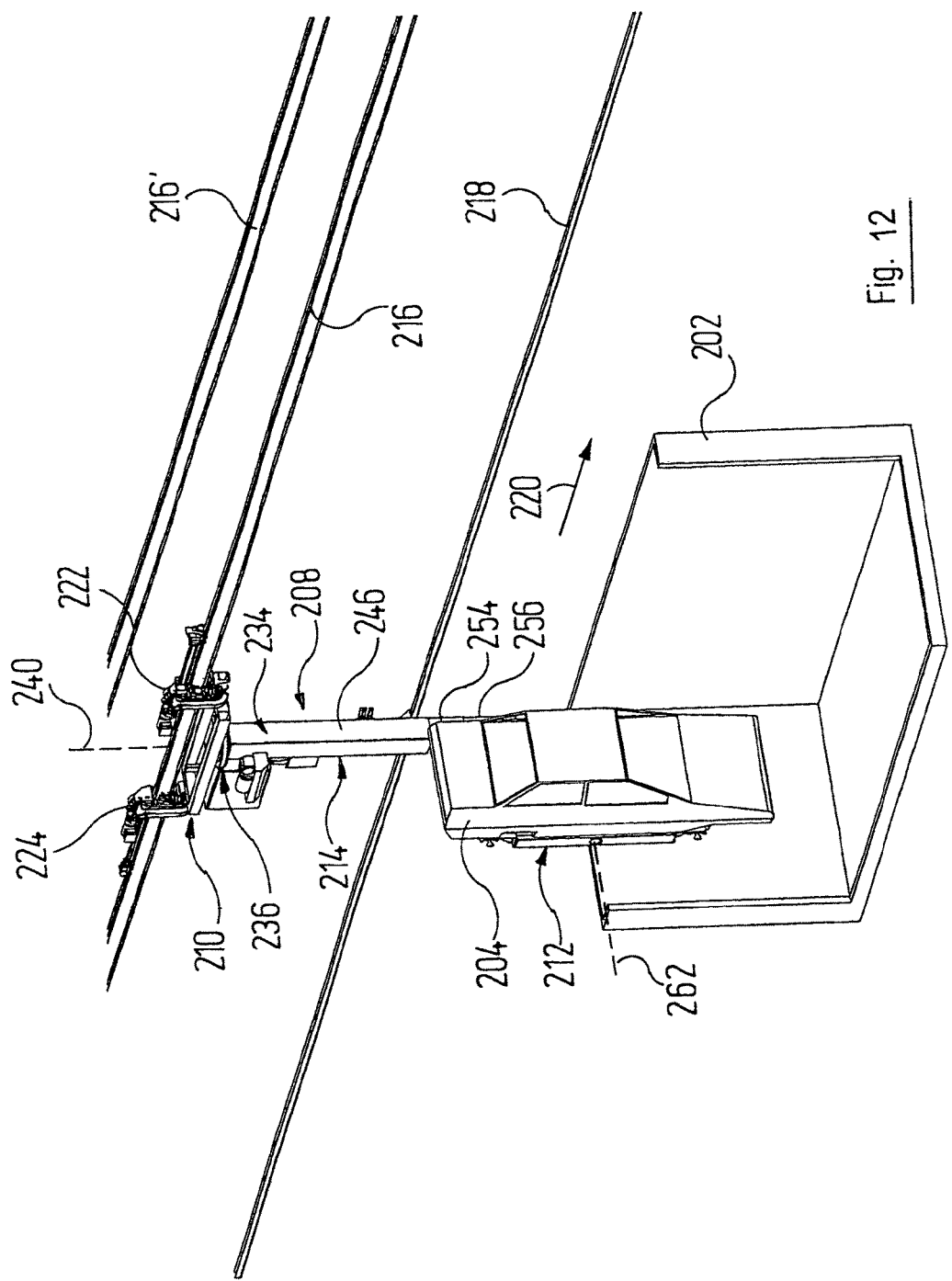
Figure 13:
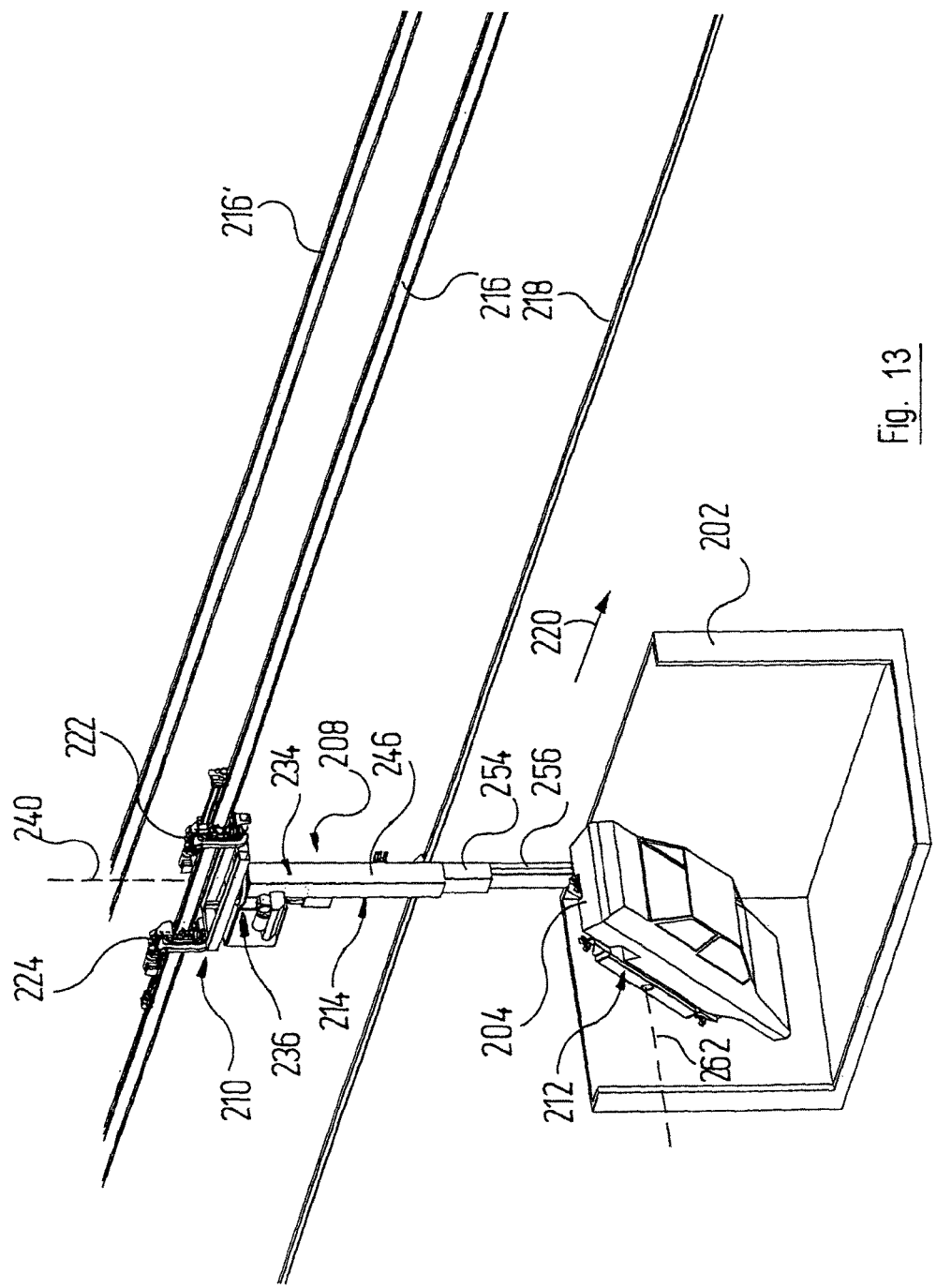

As the slide 256 continues to be lowered and the vehicle body 204 continues to be rotated about the axis of rotation 262 of the rotary peg 260, a position is finally reached in which the vehicle body 204 is substantially vertical, as illustrated in FIG. 12. Here, the vehicle body 204 is still relatively close to the end wall of the dip bath 202 on the entry side. As the transport carriage 208 continues to move and hence the spacing between the centre of the vehicle body 204 and the end wall of the dip bath 202 on the entry side grows, the rotary peg 260 and hence the vehicle body 204 are turned further clockwise, such that the vehicle body 204 begins to lie on its back, and this is illustrated in FIG. 13. The speed of movement in the horizontal direction and the speed of rotation can in this case be matched to one another such that the front end of the vehicle body 204 maintains approximately the same spacing from the end wall of the dip bath 202 on the entry side during this dipping movement.

Figure 14:
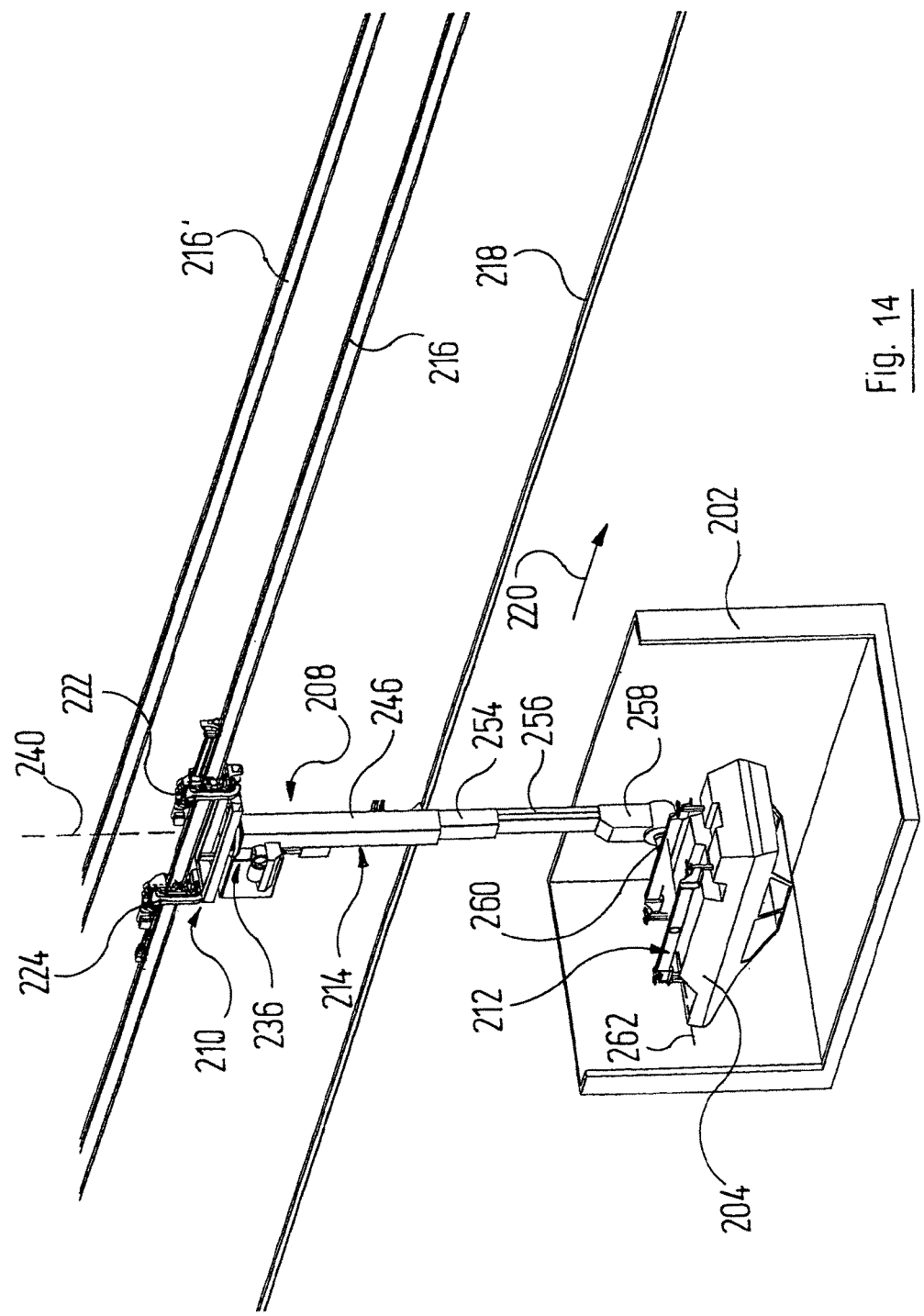

At the latest at the point at which the vehicle body 204 is completely on its "back" and hence lies horizontal again, as illustrated in FIG. 14, the vehicle body 204 is completely immersed in the liquid paint. The vehicle body 204 is conveyed further through the dip bath 202, at first in this position, with the aid of the transport carriage 208 until it has come closer to the end wall of the dip bath 202 on the exit side.

Figure 15:
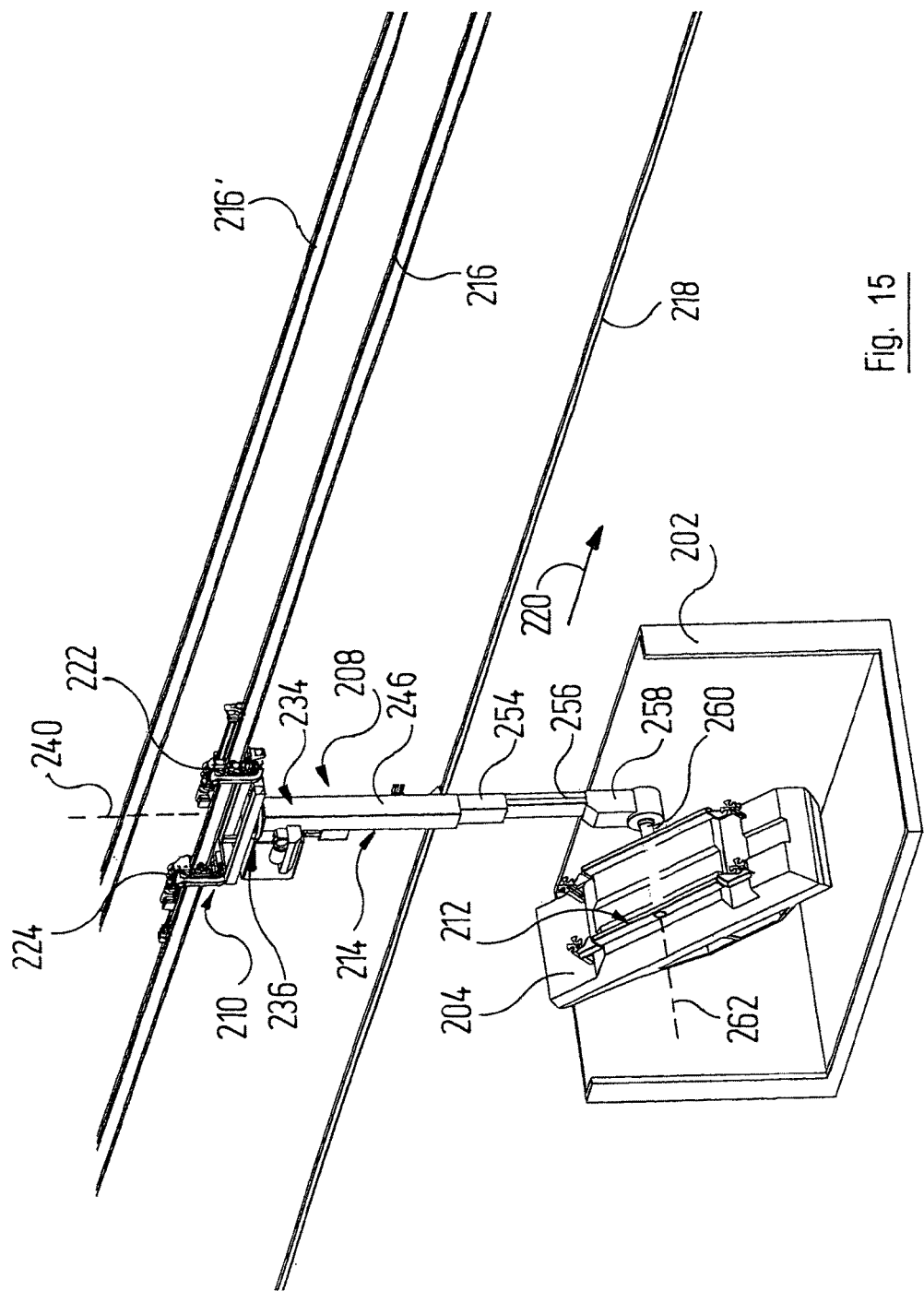
Figure 16:
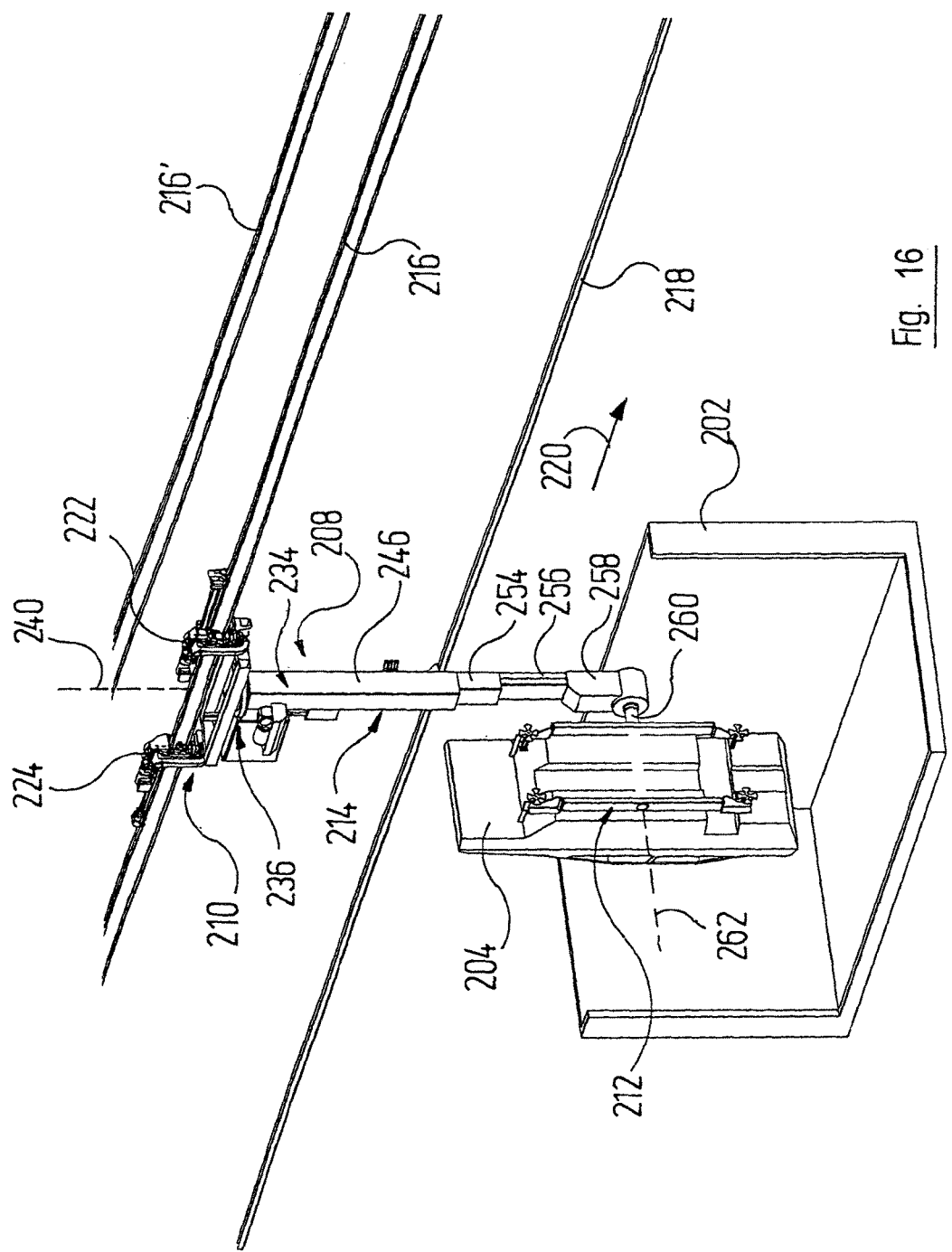
Figure 17:
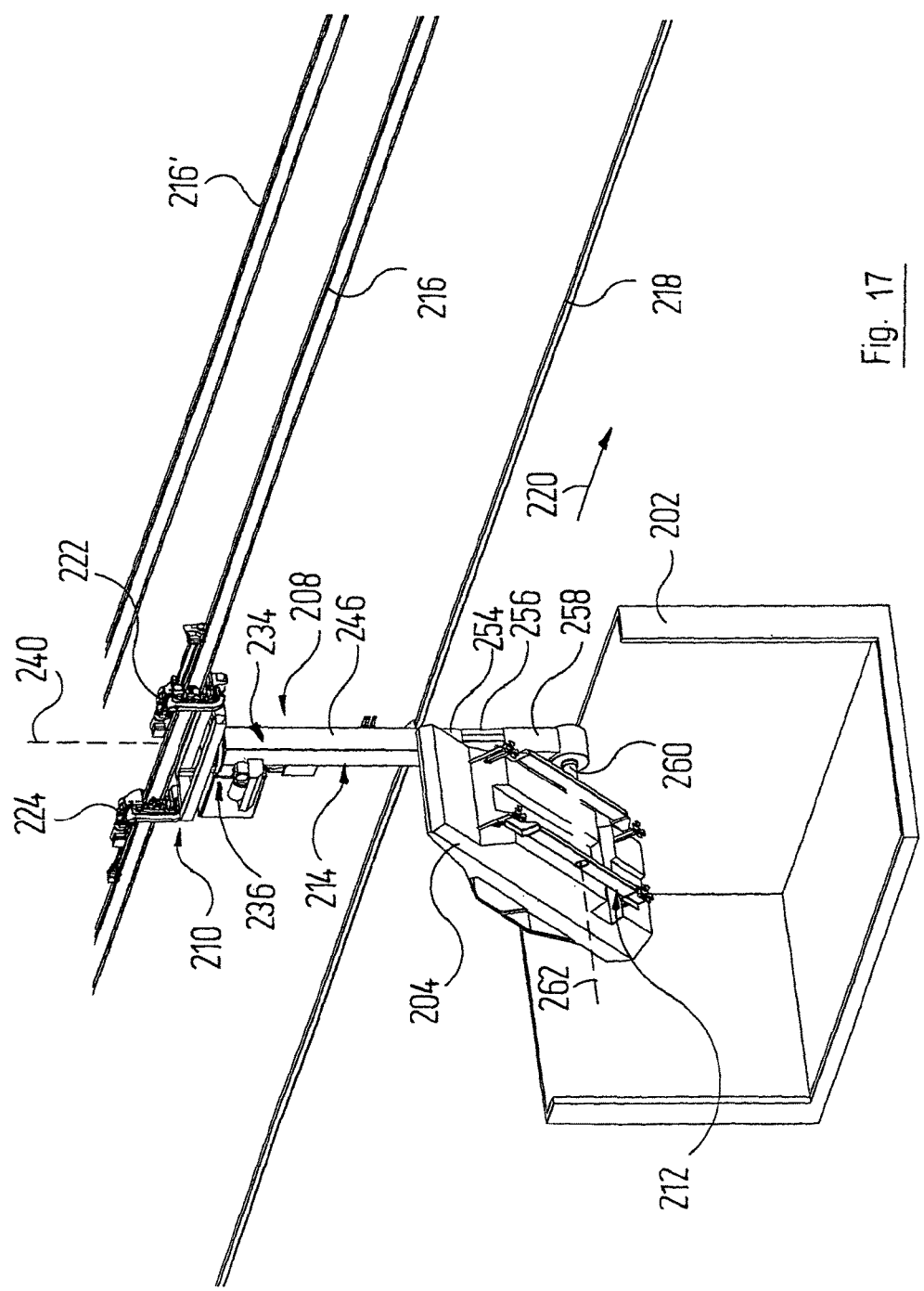
Figure 18:
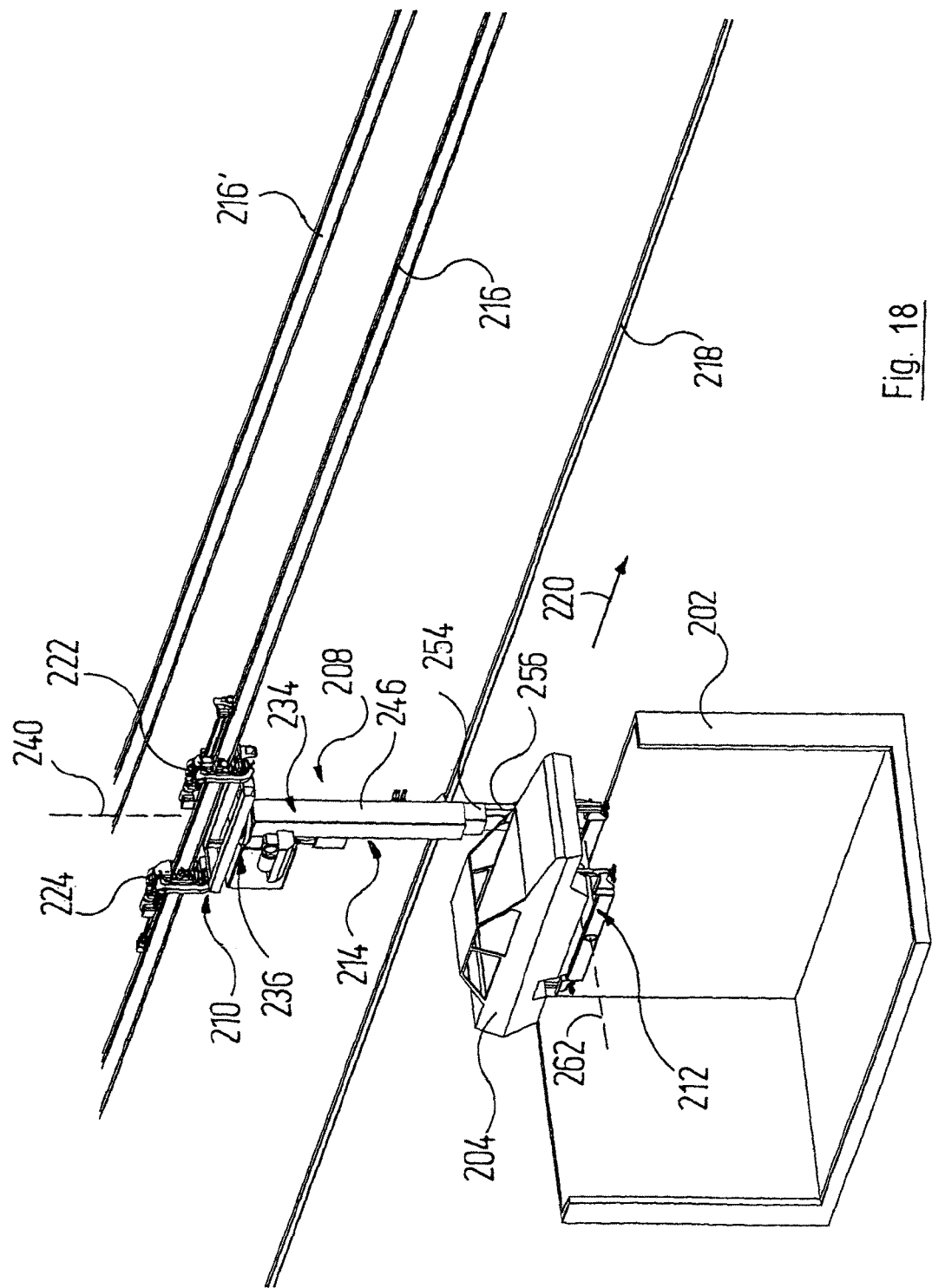

Then, the procedure of removing the vehicle body 204 from the bath begins. This procedure can once again be regarded as the superposition of three movements, namely the horizontal linear movement in the direction of conveying 220, the vertical movement along the axis of rotation 240 and hence also along the longitudinal axis of the telescopic arm 234, and the rotary movement about the axis of rotation 262 of the rotary peg 260. First the vehicle body 204, as illustrated in FIGS. 15 and 16, is set vertical by the rotary peg 260 continuing to turn clockwise. Then the vehicle body 204 is "wound" by the telescopic arm 234 being retracted and hence by an upward movement of the slide 256 and a continuation of the rotary movement up over the end wall of the dip bath 202 on the exit side (cf. FIG. 7), until a horizontal position of the freshly coated vehicle body 204 is reached again in the direction of conveying 220 downstream of the dip bath 202, as illustrated in FIG. 18.

The dip coating plant 200 described may also be used to dip coat relatively small objects (small articles). For this, holding baskets for example (not themselves shown) containing objects to be coated, which are small parts (not illustrated), loosely piled together for example, may be secured to the holding carriage 212. It will be appreciated that holding baskets of this kind are not guided through the dip bath 202 in a position in which their loading opening points downwards and objects to be coated could fall out.

As mentioned above, the telescopic arm 234 may be turned about the vertical axis of rotation 240 by way of the servo motor 242. In the kinematic arrangement shown in FIGS. 1 and 10 to 18, the telescopic arm 234 adopts a position in respect of its vertical axis of rotation 240 in which the rotary peg 260 is aligned on the slide 256 such that its horizontal axis of rotation 262 is perpendicular to the direction of movement 220. The telescopic arm 234 is held in this position by an appropriate locking of the servo motor 242.

Figure 10:
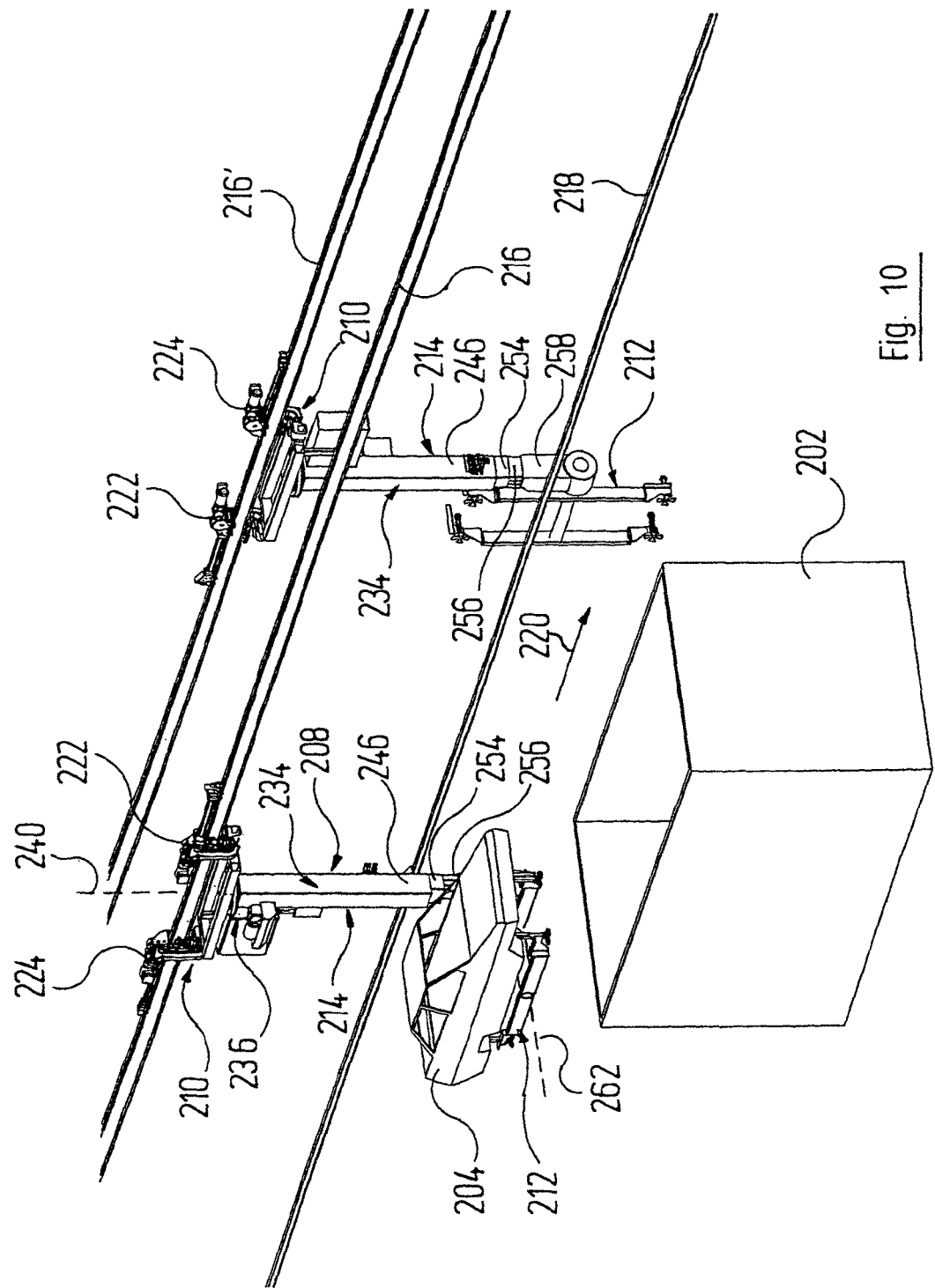
FIGS. 10 to 18 show phases in the dipping of a vehicle body into the dip bath of the cataphoretic dip coating plant from FIG. 1, from different perspectives.

The fact that the telescopic arm 234 can be turned about the vertical axis of rotation 240 only becomes relevant, in the kinematic arrangement shown in FIGS. 1 and 10 to 18, once the vehicle bodies 204 have left the dip bath 202 and are removed from the transport carriages 208 for further processing. The transport carriages 208 then have to be guided back to the entry of the dip coating plant 200 so that they can be laden again there with vehicle bodies 204 which have yet to be coated. For this purpose, the holding carriage 212 is turned in relation to the connection frame 230 of the drive carriage 210 about the vertical axis of rotation 240 until the rotary peg 260 on the slide 256 is aligned parallel with the direction of movement 220, by the servo motor 242 being actuated and this turning the toothed wheel 236 on the upper telescopic part 246 of the telescopic arm 234. Moreover, the holding carriage 212 is brought by a corresponding rotation of the rotary peg 260 by way of the geared motor 264 into a position in which its longitudinal bars 266 and 268 are vertical. This position is shown in FIGS. 2 and 3. In FIG. 10, a transport carriage 208 can be seen which is guided back to the entry of the dip coating plant 200 in this "return position" on a drive rail 216' which runs parallel to the drive rail 216 and is connected thereto by way of a curved rail part (not visible).

It is also possible for the transport carriage 208 to be transferred from the drive rail 216 to the drive rail 216' by means of a transverse displacement without the need for a curved rail part connecting the drive rails 216, 216'.

As a result of rotating the holding carriage 212, and as a result of its vertical position in relation to the drive carriage 210, the space required for the transport carriage 208 on the return path from the exit of the dip coating plant 200 to the entry thereof is reduced.

The sequence of movements of the vehicle body 204, described in the preceding text with reference to FIGS. 10 to 18, as it passes through the dip bath 202 is merely one example. The structural construction of the transport carriage 208 allows a number of other kinematic arrangements which can respectively be adapted to the type of vehicle body 3. For example, the vehicle body 204 may be guided through the dip bath 202 "roof upwards".

As an alternative, it is possible for the axis of rotation 262 of the holding carriage 212 to be guided just above the liquid level of the liquid in the dip bath 202. In this case, the vehicle body will be guided through the dip bath 202 "roof downwards". Here, it is possible to prevent either the holding carriage 212 or the slide 256 from coming into contact with liquid in the bath, as a result of which the risk that liquid in the bath will be transferred from one dip bath to the next, or that lubricant will be introduced into the dip baths, is reduced.

It is for example also possible to make use of the further degree of freedom which is provided by the vertical axis of rotation 240 as the vehicle body 204 is guided through the dip bath 202. In this case, with appropriate dimensions of the dip bath 202, a vehicle body 204 may also be guided through this transversely and not in the longitudinal direction as illustrated in FIGS. 10 to 18. It is also possible to rotate the telescopic arm 234 about the vertical axis of rotation 240 far enough for the rotary peg 260 or the axis of rotation thereof 262 to form an angle of between 0 and 90° with the direction of movement 220. It is also possible for the telescopic arm 234 to be rotated back and forth about the vertical axis of rotation 240 while the vehicle body 204 is guided through the dip bath 202, as a result of which a "rolling" motion of the vehicle body 204 in the dip bath 202 can be achieved.

It is thus possible for the vehicle body 204 to perform a sequence of movements which can be regarded as the superposition of four movements, namely a horizontal linear movement (corresponding to the direction of movement 220), a vertical linear movement along the axis of rotation 240 and hence along the longitudinal axis of the telescopic arm 234, a rotary movement about the horizontal axis of rotation 262 of the rotary peg 260, and a rotary movement about the vertical axis of rotation 240 of the telescopic arm 234.

The conveyor system 206, which takes the form of an overhead conveyor system, requires no further structures to the right and/or left of the dip bath 202, as are required in plant of different design. This means that the dip coating plant 200 can be kept relatively narrow overall.

Moreover, as a result of the lateral mounting of the holding carriage 212, no shadows are cast on the vehicle body 204 by further components of the transport carriage 208 which would have to be compensated for in the dip bath in a correspondingly complex manner by a suitable kinematic arrangement and/or a relatively long dwell time in the dip bath.

When the vehicle body 204 is guided through the dip bath, the lower end region 258 of the slide 256 carrying the horizontal rotary peg 262 is lowered into the liquid in the bath. This means that the horizontal axis of rotation 260 may be arranged close to the centre of gravity of the vehicle body 204 supported by the holding carriage 212. This results in a more favourable distribution of forces during the sequence of movements for the vehicle body than is the case in known systems in which the axis of rotation lies relatively far away from the centre of gravity of the vehicle body.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. An overhead conveyor system for transporting objects, in particular for transporting vehicle bodies, in a treatment plant comprising:
   a) at least one transport carriage which includes a securing device to which at least one object may be secured;
   b) at least one rail carrying the transport carriage;
   c) at least one drive means for moving the transport carriage along the rail;
   in which
   d) the entire securing device is always arranged below the rail,
   wherein e) the transport carriage is set up such that the securing device is conveyed laterally offset from the rail when an object is secured to the securing device, wherein the securing device includes a holding structure having securing means directly mounted to the holding structure, the holding structure having only one side surface directly mounted to a telescopic arm of the transport carriage by a drivable rotary peg such that the holding structure is rotatable 360 degrees from an upright position to an inverted position and back to the upright position about a horizontal axis of rotation formed by the rotary peg, wherein the drivable rotary peg is located below an object secured to the holding structure when the object is in an upright position.

2. The overhead conveyor system of claim 1, wherein the securing device is mounted such that it is rotatable about a vertical axis of rotation.

3. The overhead conveyor system of claim 1, wherein the transport carriage includes as the drive means a drive carriage which may be moved by motor on the rail.

4. The overhead conveyor system of claim 3, wherein the telescopic arm is mounted on the drive carriage of the transport carriage such that it is rotatable about the vertical axis of rotation.

5. The overhead conveyor system of claim 1, wherein the securing means are provided which secure the transport carriage to prevent tipping about a tilt axis parallel to the rail.

6. The overhead conveyor system of claim 5, wherein the securing means include a support structure which is arranged parallel to and below the rail and which supports the holding carriage.

7. The overhead conveyor system of claim 6, wherein the securing means include a guide roller which is mounted on the transport carriage, is rotatable about a vertical axis of rotation and is guided in a guide rail that is complementary thereto, with the guide rail running below the drive rail and parallel thereto.

8. The overhead conveyor system of claim 1, wherein the holding structure includes hollow profiles, the securing means being mounted directly to the hollow profiles.

9. The overhead conveyor system of claim 1 wherein the holding structure includes two parallel bars, the securing means being mounted directly to the parallel bars.

10. The overhead conveyor system of claim 1 wherein the holding structure is rotated to a position directly beneath the rail when an object is not secured to the securing device.

11. The overhead conveyor system of claim 1, further comprising a motor, the motor being operably connected to the rotary peg such that the motor controls rotation of the holding structure about the horizontal axis of rotation by rotating the rotary peg.

12. The overhead conveyor system of claim 11, wherein the holding structure is rotated to the inverted position after the telescopic arm is fully extended.

13. The overhead conveyor system of claim 12, wherein the holding structure is rotated about the horizontal axis of rotation to
a first intermediate position wherein the holding structure extends substantially parallel to the telescopic arm when the telescopic arm is fully extended before being rotated to the inverted position, and
a second intermediate position wherein the holding structure extends substantially parallel to the telescopic arm when the telescopic arm is fully extended before being rotated back to the upright position from the inverted position.

14. A dip treatment plant, comprising:
a) at least one dip bath which can be filled with a treatment liquid and into which objects to be treated, in particular vehicle bodies, can be dipped;
b) a conveying plant which can bring the objects to be treated to the dip bath, put them into the interior of the dip bath, take them out of the dip bath and move them away therefrom, the conveying plant including:
at least one transport carriage which includes a securing device to which at least one object may be secured;
at least one rail carrying the transport carriage;
at least one drive means for moving the transport carriage along the rail;
in which the entire securing device is always arranged below the rail, and,
the transport carriage is set up such that the securing device is conveyed laterally offset from the rail when an object is secured to the securing device,
wherein the securing device includes a holding structure having securing means directly mounted to the holding structure, the holding structure having a side surface directly mounted to a telescopic arm of the transport carriage by a drivable rotary peg such that the holding structure is rotatable 360 degrees from an upright position to an inverted position and back to the upright position about a horizontal axis of rotation formed by the rotary peg, wherein the drivable rotary peg is located below an object secured to the holding structure when the object is in an upright position.

15. The overhead conveyor system of claim 14, wherein the holding structure includes hollow profiles, the securing means being mounted directly to the hollow profiles.

16. The overhead conveyor system of claim 14 wherein the holding structure is rotated to a position directly beneath the rail when an object is not secured to the securing device.

* * * * *